US009068552B2

(12) United States Patent
Kawaguchi et al.

(10) Patent No.: US 9,068,552 B2
(45) Date of Patent: Jun. 30, 2015

(54) WAVE POWER GENERATION DEVICE AND METHOD OF CONTROLLING THE SAME

(75) Inventors: Takashi Kawaguchi, Tokyo (JP); Toshihiko Maemura, Tokyo (JP)

(73) Assignee: MITSUI ENGINEERING & SHIPBUILDING CO., LTD., Tokyo (JP)

(*) Notice: Subject to any disclaimer, the term of this patent is extended or adjusted under 35 U.S.C. 154(b) by 96 days.

(21) Appl. No.: 13/561,270

(22) Filed: Jul. 30, 2012

(65) Prior Publication Data
US 2013/0229011 A1 Sep. 5, 2013

(30) Foreign Application Priority Data

Mar. 2, 2012 (JP) ................................. 2012-047054

(51) Int. Cl.
*F03B 13/12* (2006.01)
*F03B 13/18* (2006.01)

(52) U.S. Cl.
CPC ........... *F03B 13/1815* (2013.01); *F03B 13/186* (2013.01); *F05B 2270/404* (2013.01); *Y02E 10/38* (2013.01)

(58) Field of Classification Search
CPC ............... F03B 13/1815; F03B 13/186; F03B 13/1845; F03B 13/18; F03B 13/16; Y02E 10/38
USPC ...................................................... 290/42, 53
See application file for complete search history.

(56) References Cited

U.S. PATENT DOCUMENTS

| 6,812,588 | B1* | 11/2004 | Zadig .............................. 290/53 |
| 7,305,823 | B2 | 12/2007 | Stewart et al. |
| 7,598,624 | B2* | 10/2009 | Loui et al. ....................... 290/42 |
| 2010/0148504 | A1* | 6/2010 | Gerber ............................ 290/42 |
| 2010/0327595 | A1* | 12/2010 | Gottler ............................ 290/53 |
| 2012/0074702 | A1* | 3/2012 | Ahdoot ........................... 290/53 |
| 2012/0248775 | A1* | 10/2012 | Stewart et al. .................. 290/53 |
| 2012/0248865 | A1* | 10/2012 | Eder et al. ..................... 307/9.1 |
| 2013/0009401 | A1* | 1/2013 | Biteryakov ..................... 290/53 |
| 2013/0009402 | A1* | 1/2013 | Williams ........................ 290/53 |
| 2013/0056988 | A1* | 3/2013 | Hunt et al. ..................... 290/53 |
| 2013/0161948 | A1* | 6/2013 | Sarokhan ....................... 290/42 |

FOREIGN PATENT DOCUMENTS

JP          56154168 A   * 11/1981
JP         2007518024 A    7/2007

* cited by examiner

*Primary Examiner* — Tulsidas C Patel
*Assistant Examiner* — Viet Nguyen
(74) *Attorney, Agent, or Firm* — Westerman, Hattori, Daniels & Adrian, LLP

(57) ABSTRACT

Provided is a wave power generation device improved in power generation efficiency and a method of controlling the same, the wave power generation device generating electric power by extracting energy from a wave. The wave power generation device includes: a wave sensor configured to measure the waveform; a position sensor configured to measure a position of a float relative to a column; a drive mechanism configured to apply an external force to the float; and a controller configured to control the drive mechanism. The controller is configured to calculate a speed at which the float is to be controlled to move, from values of the wave sensor and the position sensor, and to control the drive mechanism in such away that the float moves at the calculated speed.

5 Claims, 6 Drawing Sheets

9,068,552 B2

WAVE POWER GENERATION DEVICE AND METHOD OF CONTROLLING THE SAME

BACKGROUND OF THE INVENTION

1. Field of the Invention

The present invention relates to a wave power generation device which generates electric power by extracting energy from a wave through movement of a float floating on the sea and a method of controlling the same.

2. Description of related art including information disclosed under 37 CFR §§1.97 and 1.98

Conventionally, there has been a wave power generation device with a float floating on a sea surface or in the sea (see Patent Literature 1, for example). FIG. 9 shows an example of a conventional wave power generation device. The wave power generation device 1X includes: a column 2X moored by an anchor 31 installed on a sea floor and a mooring line 32; and a float 3X floating on a sea surface 10 by receiving buoyancy. The float 3X is configured to receive a force of a wave and move up and down relative to the column 2X (see the arrow in FIG. 9).

Moreover, the wave power generation device 1X includes a frame body 5X for transmitting the movement of the float 3X to a power generator (not shown) installed in the column 2X. Furthermore, the wave power generation device 1X may also include a buoyancy adjustment part 33 for adjusting the position of the wave power generation device 1X in the vertical direction in the sea. This conventional float 3X has a point symmetric shape about the column 2X, such as a disc shape or a cylindrical shape, for example, and specifically has an annular shape (ring shape). In the drawing, W represents the wave, F represents an upstream side from which the wave W comes, and R represents a downstream side being the opposite side to the side from which the wave W comes.

FIG. 10 shows a schematic cross-sectional view of the wave power generation device 1X. The wave power generation device 1X includes: a power generator (hereafter, referred to as motor) 4 installed inside the column 2X; and the frame body 5X configured to extend upward from the float 3X and then inserted into the column 2X. The frame body 5X, a rack 6 formed in a portion of the frame body 5X, and a pinion 7 provided in the motor 4 form a power transmission mechanism which transmits motion energy of the float 3X to the motor 4.

Next, an operation of the wave power generation device 1X is described. First, the column 2X of the wave power generation device 1X is substantially fixed to the sea floor with the anchor 31 and the like and is configured to be less subject to the influence of the wave. The float 3X having received the wave moves up and down relative to the substantially-fixed column 2X. The wave power generation device 1X transmits the motion energy of the float 3X as a rotational force to the motor 4 via the power transmission mechanism (the frame body 5X, the rack 6, and the pinion 7) and generates electric power. This configuration allows the wave power generation device 1X to generate electric power by extracting energy from the wave of the sea surface 10 moving up and down.

However, the conventional wave power generation device 1X has a problem that the power generation efficiency is low. The maximum power generation efficiency of the wave power generation device 1X is about 20%. This is because the wave power generation device 1X collects only part of the energy of the wave (incident wave) colliding with the float 3X. Most of the remaining energy of the incident wave is turned into a wave (reflection wave) generated by the collision with the float 3X and into a wave (transmitted wave) formed behind the float 3X, and does not contribute to power generation. Hence, it is difficult to improve the power generation efficiency of the wave power generation device 1x.

CITATION LIST

Patent Literature

Japanese patent application Kokai publication No. 2007-518024

BRIEF SUMMARY OF THE INVENTION

Technical Problems

The present invention has been made in view of the problem described above and an object thereof is to provide a wave power generation device improved in power generation efficiency and a method of controlling the same, the wave power generation device generating electric power by extracting energy from a wave.

Solution to Problems

A wave power generation device for achieving the above object according to the present invention comprises: a column; float configured to move relative to the column, a power generator configured to generate electric power through the movement of the float; a wave sensor configured to measure a waveform; a position sensor configured to measure a position of the float relative to the column; a drive mechanism configured to apply an external force to the float; and a controller configured to control the drive mechanism, wherein the controller is configured to calculate a speed at which the float is to be controlled to move, from values of the wave sensor and the position sensor, and to control the drive mechanism in such a way that the float moves at the calculated speed.

This configuration improves the power generation efficiency of the wave power generation device. This is because a wave (transmitted wave) occurring on the downstream side of the float and a wave (reflection wave) occurring on the upstream side of the float due to reflection can be prevented or suppressed by actively controlling the float in accordance with the oscillation of the wave.

The above wave power generation device is characterized in that a back surface of the float on a downstream side being an opposite side to a side from which a wave comes has a profile identical or similar to a trajectory of the movement of the float.

This configuration can improve the power generation efficiency of the wave power generation device. This is because the back surface of the float is formed to have a profile identical or similar to a movement direction of the float and the resistance of the float against water generated upon the movement of the float can be thereby reduced. Hence, occurrence of the wave (transmitted wave) formed on the downstream side of the float is prevented or suppressed and the energy can be collected as the motion energy of the float.

The above wave power generation device is characterized in that the wave power generation device includes the column whose longitudinal direction is vertical and the float which moves up and down along the column, and the float is configured such that an angle formed between a bottom surface and the back surface on the downstream side being the opposite side to the side from which the wave comes is smaller than 90°. With this configuration, the operation and effect as described above can be obtained.

The above wave power generation device is characterized in that the wave power generation device includes the column whose longitudinal direction is horizontal and the float which moves to turn about the column, and the float is configured such that part of a bottom surface and the back surface on the downstream side being the opposite side to the side from which the wave comes has a cylindrical shape having the column as a central axis. With this configuration, the operation and effect as described above can be obtained.

A method of controlling a wave power generation device for achieving the above object according to the present invention includes: a column moored in the sea; a float configured to move relative to the column; and a power generator configured to generate electric power through the movement of the float, the float configured such that a back surface on a downstream side being an opposite side to a side from which a wave comes has a profile identical or similar to a trajectory of the movement of the float, the wave power generation device further including: a wave sensor configured to measure a waveform; a position sensor configured to measure a position of the float relative to the column; a drive mechanism configured to apply an external force to the float; and a controller configured to control the drive mechanism, the method comprising: a measurement step of causing the wave sensor to calculate a mean water level of a sea surface from the measured waveform to measure a position of the wave relative to the mean water level, and causing the position sensor to measure a position of the float relative to the column; a computation step of calculating a speed at which the float is to be controlled from the measured position of the float and the measured position of the wave; and a float control step of applying an external force to the float with the drive mechanism in such a way that the float moves at the speed at which the float is to be controlled. With this configuration, the operation and effect as described above can be obtained.

Advantageous Effect of Invention

According to a wave power generation device of the present invention, it is possible to provide a wave power generation device improved in power generation efficiency and a method of controlling the same.

DETAILED DESCRIPTION OF THE INVENTION

Figure 1:
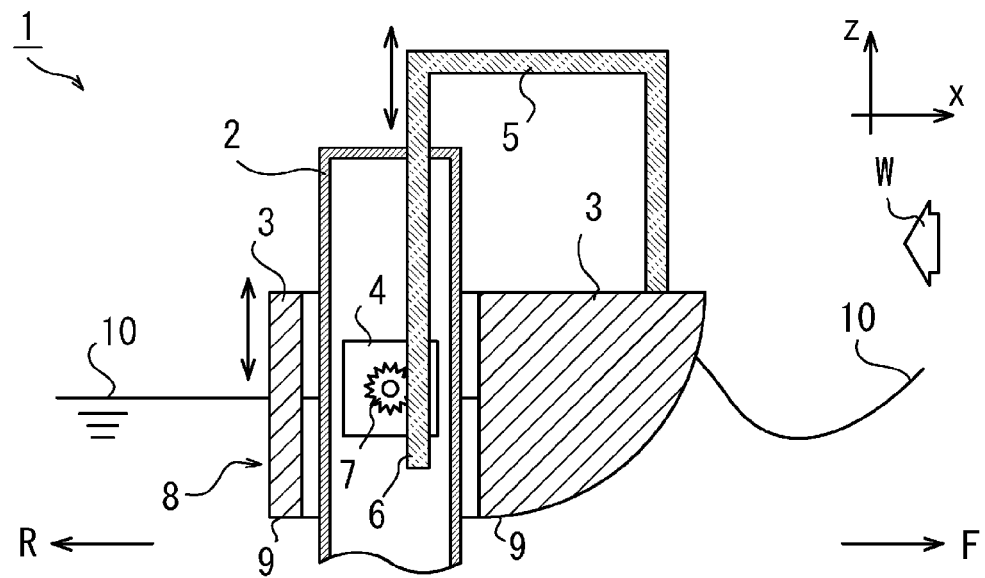
FIG. 1 is a schematic cross-sectional view of a wave power generation device of a first embodiment of the present invention.

Descriptions are given below of a wave power generation device of a first embodiment of the present invention with reference to the drawings. FIG. 1 shows a schematic cross-sectional view of a wave power generation device 1 of the embodiment of the present invention. The wave power generation device 1 includes a column 2 moored in a sea, a float 3 configured to move relative to the column 2, and a power generator (hereafter, also referred to as motor) 4 configured to generate electric power through the movement of the float 3. Specifically, the wave power generation device 1 includes the column 2 whose longitudinal direction is vertical and the float 3 which moves up and down along the column 2. The float 3 is configured such that the volume of a portion on a downstream side R (left side in FIG. 1) of the column 2 is smaller than the volume of a portion on an upstream side F (right side in FIG. 1) of the column 2, the upstream side F being a side from which a wave W comes, the downstream side R being the opposite side to the side from which the wave W comes. Moreover, a back surface 8 of the float 3 on the downstream side R is configured to have a profile identical to a trajectory of the movement of the float 3 which is shown by the arrow. Specifically, since the float 3 moves up and down in the vertical direction, the back surface 8 is configured to be a flat surface parallel to the vertical direction. This configuration can suppress the occurrence of wave (transmitted wave) transmitted to the downstream side R of the float 3 via the back surface 8 when the float 3 moves up and down. This is because the back surface 8 does hardly any work on water when the float 3 moves up and down.

Although the wave power generation device 1 is illustrated to include a frame body 5, a rack 6 formed in a portion of the frame body 5, and a pinion 7 provided in the motor 4 as a power transmission mechanism configured to transmit motion energy of the float 3 to the motor 4, the present invention is not limited to this configuration. The power transmission mechanism and the power generator 4 may have any configuration which extracts energy from the upward and downward movement of the float 3 and generates electric power, such as power generation using electromagnetic induction and adoption of a piezo-electric device. Moreover, a column which is fixed to a wall along a shore or a column which is directly fixed to a sea floor can be used as the column 2 instead of the column moored in the sea.

Figure 2:
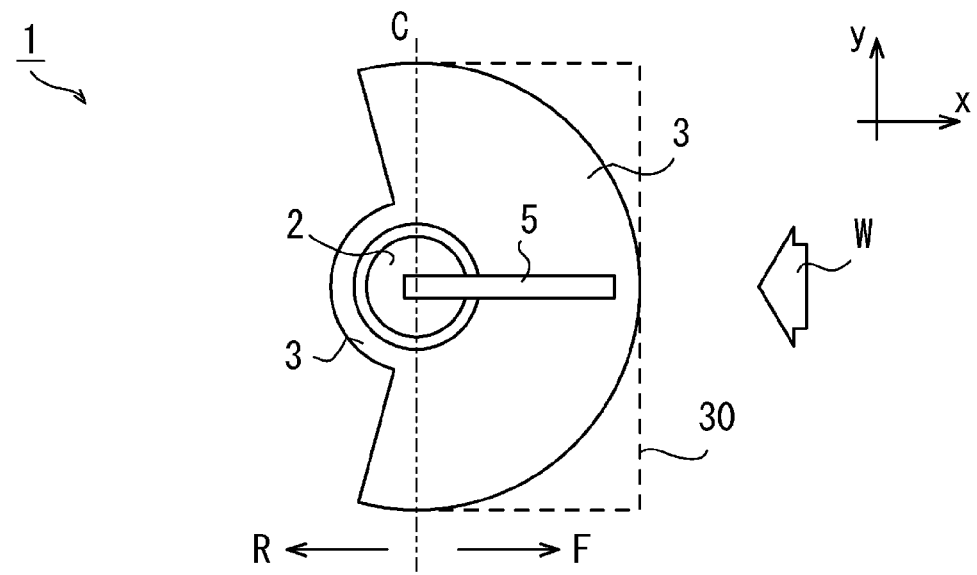
FIG. 2 is a schematic plan view of the wave power generation device of the first embodiment of the present invention.

FIG. 2 shows a schematic plan view of the wave power generation device 1. The float 3 is formed such that the volume of the portion on the upstream side F of a center line (two-dot chain line) C passing through the center of the column 2 in a plan view is larger than the volume of the portion on the downstream side R. Specifically, the float 3 is configured to have an annular shape (ring shape) having a portion cut away. The shape of the float 3 is not limited to the one described above. For example, a square-shaped float 30 protruding on the upstream side F in the plan view as shown by the broken line may be used. In other words, the float 3 of the wave power generation device 1 may be any float which is formed such that the volume of the portion on the upstream side F is larger than the volume of the portion on the downstream side R. The larger the difference in volume between the portion of the float on the upstream side F and the portion of the float on the downstream side R, the more the occurrence of the wave (transmitted wave) transmitted to the downstream side R is suppressed (see a sea surface 10 of FIG. 1).

Note that the direction of the upstream side F and the downstream side R of the incoming wave W is determined for each sea area (point) where the wave power generation device 1 is installed. The travelling direction of the wave W is determined to be constant within a certain range in each point. Particularly, when a land is close, the wave W travels toward the land.

The configuration described above can improve the power generation efficiency of the wave power generation device 1. This is because the wave (transmitted wave) occurring on the downstream side R of the float 3 with the upward and downward movement of the float 3 can be prevented or suppressed. The conventional float 3X (see FIGS. 9 and 10) moves up and down upon receiving energy of an incident wave at the portion on the upstream side F and this upward and downward movement forms the transmitted wave on the downstream side R of the float 3X. The wave power generation device 1 can collect, as electric power, energy which has been consumed in the conventional case to form the transmitted wave. Accordingly, the power generation efficiency can be improved.

Figure 3:
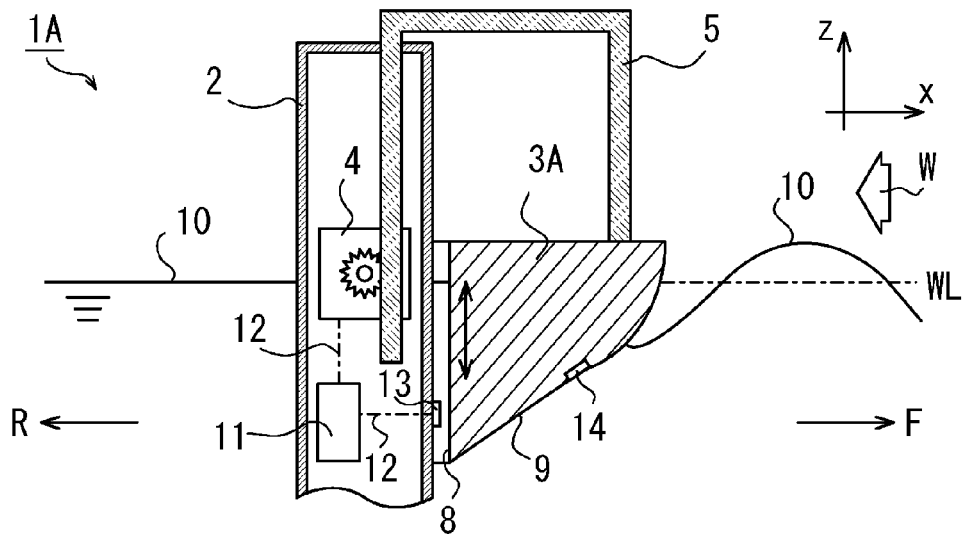
FIG. 3 is a schematic cross-sectional view of a wave power generation device of a second embodiment of the present invention.

FIG. 3 shows a schematic cross-sectional view of a wave power generation device 1A of a second embodiment of the present invention. The wave power generation device 1A includes: a position sensor 13 configured to measure the position of a float 3A relative to a column 2 or a mean water level WL in a vertical direction z; a wave sensor 14 configured to measure the waveform of a wave W colliding with the float 3A; a drive mechanism (hereafter, also referred to as motor) 4 configured to apply an external force to the float 3A; and a controller 11 configured to control the drive mechanism 4. The controller 11 is connected to the position sensor 13, the wave sensor 14, and the drive mechanism 4 by signal lines 12 or radio.

Here, the power generator (motor) shown in FIG. 1 is preferably used as it is as the drive mechanism 4, but a different one may be installed instead. Moreover, the wave sensor 14 only needs to be capable of measuring the position of the wave relative to the column 2 or the position of the wave relative to the mean water level WL calculated from the waveform. Specifically, a known measuring instrument such as a pressure sensor, an ultrasonic sensor, or a water pressure meter can be used as the wave sensor 14, for example. When the pressure sensor is used as the wave sensor 14, the wave sensor 14 is installed in the float 3A at a position below the water level. When the ultrasonic sensor is used as the wave sensor 14, the wave sensor 14 is installed in the float 3A at a position above the water level. Furthermore, the float 3A has such a shape that no volume of the float 3A is present in a region on the downstream side R. In this case, the float 3A is preferably configured to be moveable to the column 2 without being detached therefrom, by installation of, for example, a guide or the like. This is to prevent a frame body 5 from deforming by an external force such as moment.

Moreover, a back surface 8 and a bottom surface 9 of the float 3A are configured to form such a wedge shape that an angle therebetween is smaller than 90°, preferably smaller than 60°, more preferably smaller than 45°. This configuration can suppress the resistance of the back surface 8 and the bottom surface 9 of the float 3A against water which is generated when the float 3A moves up and down.

Figure 4:
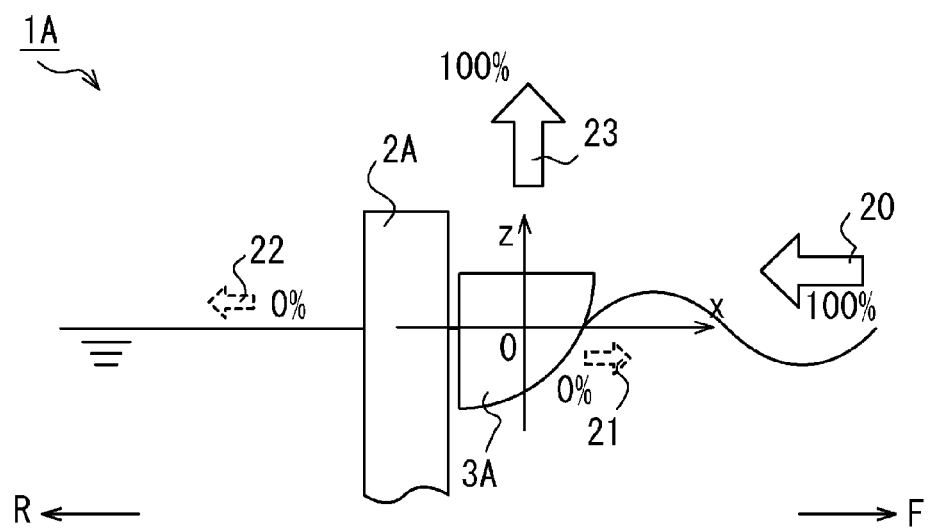
FIG. 4 is a schematic view of the wave power generation device of the second embodiment of the present invention.

Next, the control of the wave power generation device 1A is described. FIG. 4 shows a schematic diagram of the case where preconditions for the control is set. An object of the control of the wave power generation device 1A is to prevent occurrence of a reflection wave 21 and a transmitted wave 22 by actively controlling the float 3A with the drive mechanism (motor) 4 with respect to an incident wave 20. Specifically, the wave power generation device 1A can extract entire energy of the incident wave 20 as collected energy 23 and use it to generate electric power. In other words, the control aims to obtain a power generation efficiency of 100%.

Formulae used in the control are described below. In FIG. 4, it is assumed that the incident wave 20 and the reflection wave 21 are respectively $\eta_i$ and $\eta_r$, and the wave amplitudes thereof are respectively $a_i$ and $a_r$. The relationships between $\eta_i$ and $a_i$ and between $\eta_1$, and $a_r$ can be expressed by Formula (1) shown below.

$$\eta_i = a_i \cos(\omega t + Kx + \epsilon_i)$$
$$\eta_r = a_r \cos(\omega t - Kx + \epsilon_r) \qquad (1)$$

When the position of the float 3A is $x=0$, $x=0$ can be substituted into Formula (1) to obtain Formula (2).

$$\eta_i = a_i \cos(\omega t + \epsilon_i)$$
$$\eta_r = a_r \cos(\omega t + \epsilon_r) \qquad (2)$$

Next, considerations are made of such a condition (complete absorption condition) that the incident wave 20 described above is absorbed by the upward and downward movement of the float 3A while the reflection wave 21 is reduced to zero. First, when the float 3A is made to oscillate in a state with no wave, the wave formation efficiency $\overline{A}$, which is the ratio of a wave amplitude a to an amplitude e of the float 3A can be expressed by Formula (3).

$$\overline{A} = a/e \qquad (3)$$

In other words, from Formula (3), it is possible to express the amplitudes $e_r$ and $e_i$ of the float in the form of following Formula (4).

$$e_r = a_r/\overline{A}$$
$$e_i = a_i/\overline{A} \qquad (4)$$

From the above description, the upward and downward movement z of the float 3A is divided into a movement $z_i$ which reduces the reflection wave 21 to zero and a movement $z_r$ which absorbs the incident wave 20. This representation of z takes the form of Formula (5).

$$z = z_r + z_i \qquad (5)$$
$$= e_r \sin(\omega t + \varepsilon_r) - e_i \sin(\omega t + \varepsilon_i)$$

The speed z' of the control of the upward and downward movements $z'_r$ and $z'_i$ of the float 3A takes the form of Formula (6).

$$z' = z'_r + z'_i \qquad (6)$$
$$= e_r \omega \cos(\omega t + \varepsilon_r) - e_i \omega \cos(\omega t + \varepsilon_i)$$

Moreover, velocity potential ø is given by Formula (7).

$$\phi = a_r \frac{g}{\omega} \frac{\cosh K(z+h)}{\cosh Kh} \sin(\omega t - Kx + \varepsilon_r) + \qquad (7)$$
$$a_i \frac{g}{\omega} \frac{\cosh K(z+h)}{\cosh Kh} \sin(\omega t + Kx + \varepsilon_i) -$$

-continued $$\cos(\omega t + \varepsilon_r) \sum_{n=1}^{\infty} \overline{C_n} e_r \frac{g}{\omega} \frac{\cos K(z+h)}{\cos Kh} e^{-Knx} +$$

$$\cos(\omega t + \varepsilon_i) \sum_{n=1}^{\infty} \overline{C_n} e_i \frac{g}{\omega} \frac{\cos K(z+h)}{\cos Kh} e^{-Knx}$$

$$= \overline{A} e_r \frac{g}{\omega} \frac{\cosh K(z+h)}{\cosh Kh} \sin(\omega t - Kx + \varepsilon_r) +$$

$$\overline{A} e_i \frac{g}{\omega} \frac{\cosh K(z+h)}{\cosh Kh} \sin(\omega t + Kx + \varepsilon_i) -$$

$$\cos(\omega t + \varepsilon_r) \sum_{n=1}^{\infty} \overline{C_n} e_r \frac{g}{\omega} \frac{\cos K(z+h)}{\cos Kh} e^{-Knx} +$$

$$\cos(\omega t + \varepsilon_i) \sum_{n=1}^{\infty} \overline{C_n} e_i \frac{g}{\omega} \frac{\cos K(z+h)}{\cos Kh} e^{-Knx}$$

Here, K is a wave number obtained by dividing $2\pi$ by L (i.e., $K=2\pi/L$), where L is the wavelength of a wave; and $C_n$ is a constant determined based on a boundary condition (i.e., an environmental condition of the wave, which depends on the location of the column, e.g., fixed to a wall along a shore or directly fixed to a sea floor or moored in the sea). Moreover, $$\frac{\omega^2}{g} = K \tanh Kh \tag{8}$$

$$= -K_n \tan K_n h$$

The first term on the right-hand side of Formula (7) represents the reflection wave generated by the float and the second term represents the incident wave to be incident on the float and to be absorbed. Moreover, the third and fourth terms each represent a standing wave whose amplitude is largest at the front surface of the float and whose wavelength is infinitely long.

Next, considerations are made of the water surface profile at the front surface of the float. The height of the wave $\eta_{x=0}$ can be expressed by Formula (9).

$$\eta_{x=0} = \frac{1}{g} \left( \frac{\partial \phi}{\partial t} \right)_{\substack{x=0 \\ z=0}} \tag{9}$$

$$= \overline{A} e_r \cos(\omega t + \varepsilon_r) + \overline{A} e_i \cos(\omega t + \varepsilon_i) +$$

$$\sum_{n=1}^{\infty} \overline{C_n}(e_r \sin(\omega t + \varepsilon_r) - e_i \sin(\omega t + \varepsilon_i))$$

Formula (10) described below and Formulae (4) and (5) are substituted into Formula (9), and Formula (11) is thus obtained.

$$\overline{C} = \sum_{n=1}^{\infty} \overline{C_n} \tag{10}$$

$$\eta_{x=0} = a_r \cos(\omega t + \varepsilon_r) + a_i \cos(\omega t + \varepsilon_i) + \overline{C} z \tag{11}$$

Moreover, Formula (12) is obtained from Formula (6) in a similar manner.

$$\frac{\overline{A}}{\omega} z' = a_r \cos(\omega t + \varepsilon_r) - a_i \cos(\omega t + \varepsilon_i) \tag{12}$$

Formulae (11) and (12) described above are added together to obtain Formula (13).

$$\frac{\overline{A}}{\omega} z' + \eta_{x=0} - \overline{C} z = 2 a_r \cos(\omega t + \varepsilon_r) \tag{13}$$

Formula (13) is simplified by putting Formula (14) therein and Formula (15) is thus obtained.

$$\eta_{target} = a_r \cos(\omega t + \varepsilon_r) \tag{14}$$

$$z' = \frac{\omega}{\overline{A}} (2\eta_{target} - \eta_{x=0} + \overline{C} z) \tag{15}$$

Here it is preferable that no wave is generated by the float. Accordingly, Formula (16) is substituted into Formula (15) to obtain Formula (17).

$$\eta_{target} = 0 \tag{16}$$

$$z' = -\frac{\omega}{\overline{A}} (\eta_{x=0} - \overline{C} z) \tag{17}$$

It is empirically known that the frequency range of the wave does not fluctuate greatly. Accordingly, $\frac{\omega}{\overline{A}}$ and $\overline{C}$ can be set as constants $K_A$ and $K_C$ as respectively defined in Formula (18) and $K_A$ and $K_C$ can be substituted into Formula (17) to obtain Formula (19).

$$K_A = \frac{\omega}{\overline{A}} \tag{18}$$

$$K_C = \overline{C}$$

$$z' = K_A (\eta_{x=0} - K_C z) \tag{19}$$

Here, $\omega$ represents frequency and $\overline{A}$ represents wave formation efficiency. The wave formation efficiency represents a ratio of how many units of amplitude the wave moves when the float is moved one unit of amplitude. Moreover, z represents the position of the float 3A relative to the mean water level WL in a vertical direction and this value is measured by the position sensor 13. Furthermore, $\eta_{x=0}$ represents the waveform at the front surface of the float, i.e. the position of the wave relative to the mean water level WL in the vertical direction and this value is measured by the wave sensor 14 of a pressure type or the like. Formula (19) being a control formula for controlling the wave power generation device can be obtained from the formulae described above. Note that the mean water level WL is a value which changes due to the influence of rise and fall of the tides. Moreover, z and $\eta_{x=0}$ may be set to a value of the position of the float 3A relative to the apparently-fixed column 2 in the vertical direction and to a value of the position of the wave relative to the column 2 in the vertical direction, respectively. The values of z and $\eta_{x=0}$ can be easily determined from this calculation and the control is thereby simplified.

Figure 5:
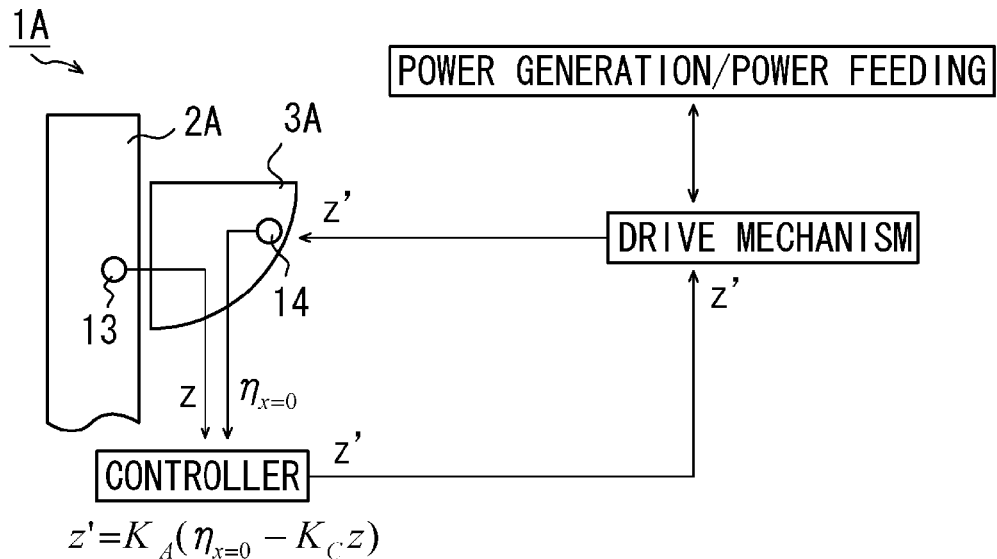
FIG. 5 is a schematic view showing a configuration of the wave power generation device of the second embodiment of the present invention.
Figure 6:
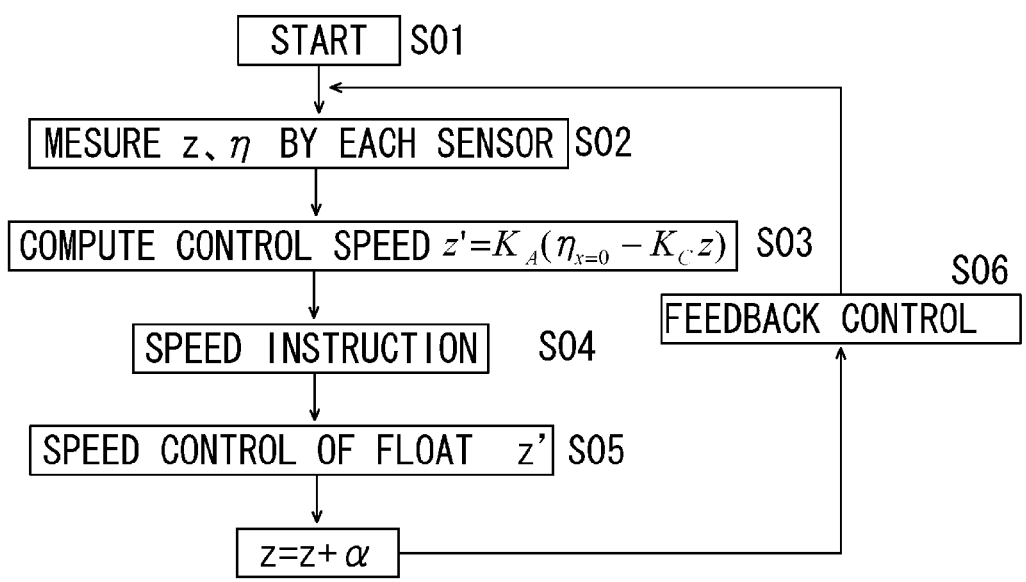
FIG. 6 is a diagram showing a control flow of the wave power generation device of the second embodiment of the present invention.

Next, the control of the wave power generation device is described. FIG. 5 shows a schematic configuration of the wave power generation device 1A and FIG. 6 shows a flow of the control. Firstly, the wave sensor 14 configured to measure the waveform calculates the mean water level WL of the sea surface from time-series data, the position sensor 13 measures the position z of the float 3A relative to the mean water level WL in the vertical direction, and the wave sensor 14 measures the height $\eta_{x=0}$ of the wave relative to mean water level WL at a position (x=0) of the float 3A which is set as a reference (measurement step S02). The measured relative position z and the height $\eta_{x=0}$ of the wave are sent to the controller 11. The controller 11 calculates a speed z' at which the float is to be controlled to move, from Formula (19) by using the position z and the height $\eta_{x=0}$ of the wave as parameters (computation step S03).

Thereafter, the controller 11 outputs the calculated speed z' to the drive mechanism (motor) 4 as a speed instruction (speed instruction step S04). The motor 4 applies an external force to the float 3A via a power transmission mechanism such as a rack-and-pinion, in such a way that the speed of the float 3A relative to the mean water level WL is z' (float control step S05). The position and the like of the float 3A made to move at the speed by this external force are measured again (feedback control S06). In other words, the float 3A has its moving speed controlled sequentially according to the changes in the position z of the float 3A and the height η of the wave. Note that motor 4 is configured to generate electric power from the energy of wave collected via the float while applying the external force to the float 3A.

The following operations and effects can be obtained from the configuration described above. First, the power generation efficiency of the wave power generation device can be drastically improved. This is because the float can be actively controlled in such a way that the reflection wave and transmitted wave are not formed.

Secondly, the control of the float can be simplified. This is because the float is controlled to move at the speed z' as shown in Formula (19). Specifically, the control can be simplified because the degrees of mechanical resistance and the like of the wave power generation device are small compared to the external force outputted by the motor and are not required to be considered. Meanwhile, the control can be performed by using a force applied to the float, for example. However, in this case, there is a need to consider the weight, the inertial force, and the like of the float and the control is complicated.

Figure 9:
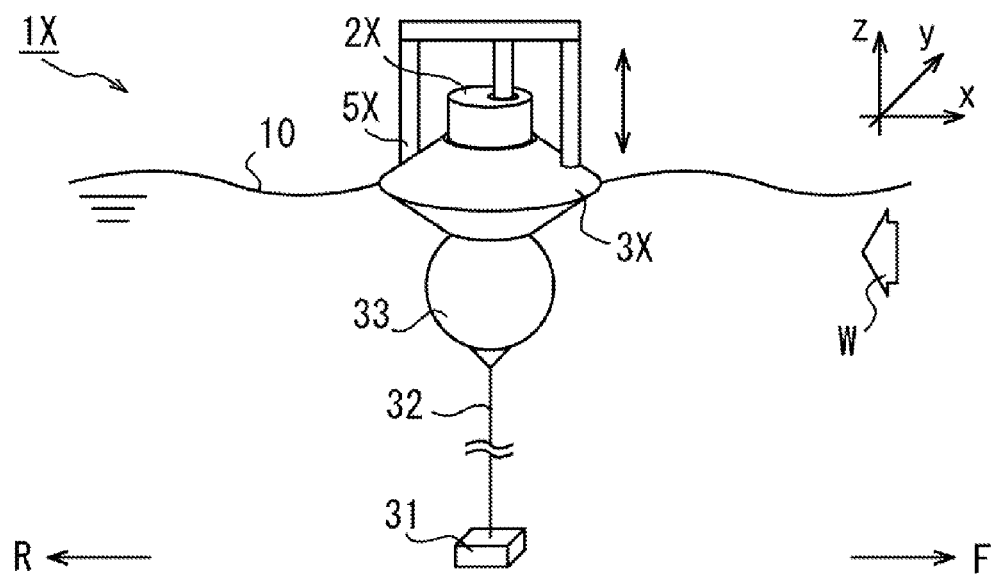
FIG. 9 is a schematic view of a conventional wave power generation device.
Figure 10:
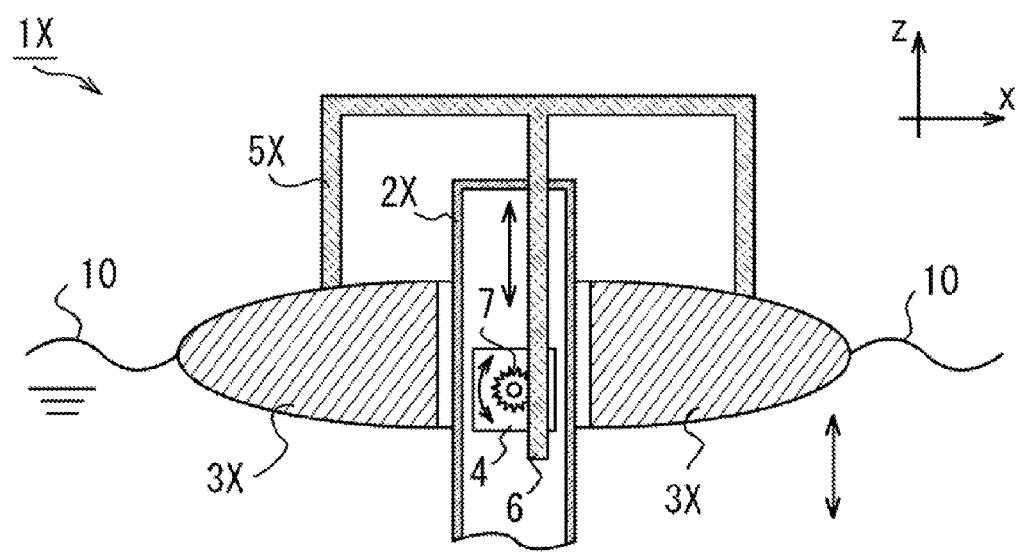
FIG. 10 is a schematic cross-sectional view of the conventional wave power generation device.

The control described above is effective to some extent also in a wave power generation device having a float with a shape similar to the conventional case (see FIGS. 9 and 10). Specifically, the control described above can suppress occurrence of transmitted wave to some extent even when the float is one having a volume of a certain size or more on the downstream side R.

The control formula can take the form of Formula (20) to further simplify the control of the float.

$$z'=K_A \cdot \eta_{x=0} \quad (20)$$

Formula (20) is obtained by deleting the term $K_c$ from Formula (19). The deletion is possible because the term $K_c$ is generally sufficiently small. In this case, the position sensor 13 is not required and the manufacturing cost of the wave power generation device can be thus reduced. Moreover, the wave power generation device can be configured to switch to the control using Formula (20) when the position sensor 13 fails in sea. This configuration allows the wave power generation device to efficiently generate electric power until the position sensor 13 is fixed.

The wave being the target of the wave power generation device has energy of about 15 kw per width of 1 m in a direction orthogonal to the travelling direction of the wave and is a wave having a cycle of about 7 to 8 seconds, for example. Regarding this wave, the amount of electric power generated by, for example, a wave power generation device having a float with a width of 10 m is 150 kw, assuming that the energy collection efficiency is 100%.

Figure 7:
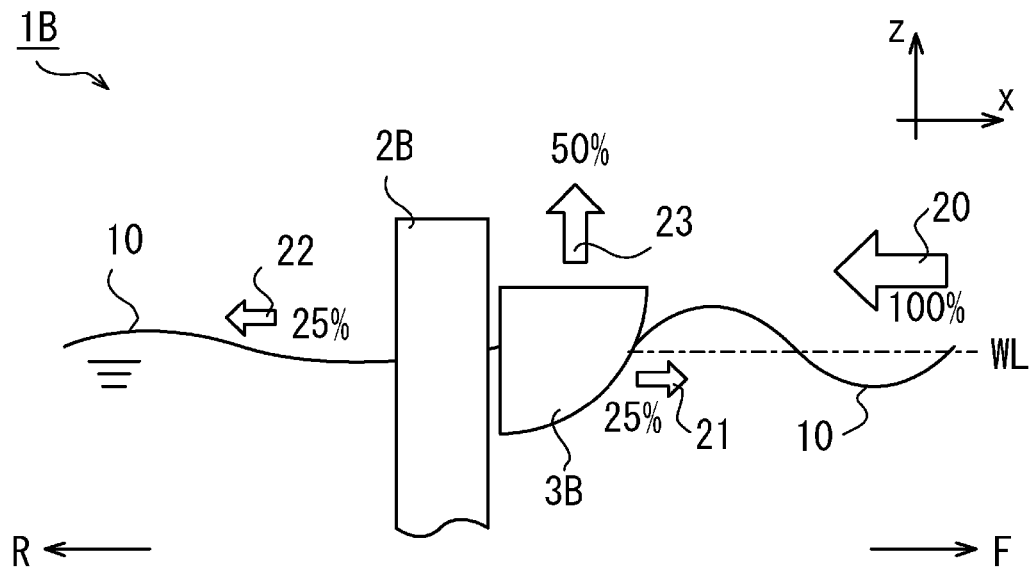
FIG. 7 is a schematic view of a wave power generation device of a third embodiment of the present invention.

FIG. 7 shows a schematic view of a third embodiment in which the preconditions for the control are set differently from the case of FIG. 4. An object of this control of a wave power generation device 1B is to reduce the amount of occurrence of a reflection wave 21 and a transmitted wave 22 to about 25% of an incident wave 20 by actively controlling a float 3B with respect to the incident wave 20 with a drive mechanism (motor) 4. Specifically, the wave power generation device 1B can extract 50% of the energy of the incident wave 20 as the collected energy 23 and use it to generate electric power. In other words, the control aims to obtain a power generation efficiency of 50%.

Formulae used in the control are described below. In FIG. 7, it is assumed that the incident wave 20 and the reflection wave 21 are respectively $\eta_i$ and $\eta_r$, and the wave amplitudes thereof are respectively $a_i$ and $a_r$, and that the phases of the incident wave 20 and the reflection wave 21 are the same. This can be expressed by Formulae (21), (22), and (23) shown below.

$$a_r = 0.5 a_i \quad (21)$$

$$\varepsilon_r = \varepsilon_i \quad (22)$$

$$\eta_i = a_i \cos(\omega t + Kx + \varepsilon_i) \quad (23)$$
$$\eta_r = a_r \cos(\omega t - Kx + \varepsilon_r)$$
$$= 0.5 a_i \cos(\omega t - Kx + \varepsilon_i)$$

When algebraic manipulations similar to the algebraic manipulations with formulae (3)-(19) performed in the description of FIG. 4 are performed, Control Formula (24) is eventually obtained.

$$z'=K_A(\eta_{x=0}-K_C z)/3 \quad (24)$$

The configuration described above can improve the electric power generation efficiency of the wave power generation device. This is because the float 3B is actively controlled to suppress the formation of the reflection wave and the transmitted wave. Moreover, the speed at which the float 3B is controlled is about ⅓ of that in the case described in FIG. 4. Accordingly, a required output of the drive mechanism (motor) can be reduced.

As similar to the case described above, Control Formula (24) can take the form of Formula (25) to further simplify the control of the float.

$$z'=K_A \cdot \eta_{x=0}/3 \quad (25)$$

Formula (25) is Formula (24) having the term of Kc deleted. The deletion is possible because the term of $K_c$ is generally sufficiently small. In this case, the position sensor 13 is not required and the manufacturing cost of the wave power generation device can be thus reduced.

Figure 8:
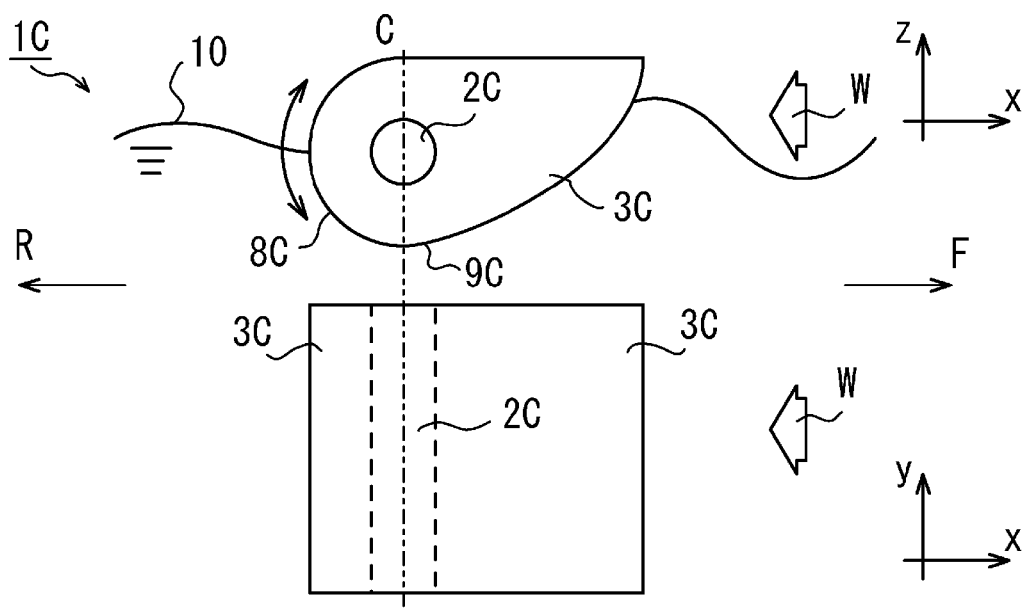
FIG. 8 shows a schematic side view and a schematic plan view of a wave power generation device of a fourth embodiment of the present invention.

FIG. 8 shows a schematic side view and a schematic side view plan view of a wave power generation device 1C of a fourth embodiment of the present invention. The wave power generation device 1C includes a column 2C whose longitudinal direction is horizontal and a float 3c configured to move to turn in an up-and-down direction about the column 2C.

Moreover, part of a back surface 8C and a bottom surface 9C of the float 3C on a downstream side R is configured to have a profile identical or similar to the trajectory of the movement of the float 3C which is shown by the arrow. Specifically, since the float 3C moves to turn about the column 2C, the part of the back surface 8C and the bottom surface 9C is configured to be a surface curved about the column 2C (cylindrical shape). This configuration can suppress occurrence of a wave (transmitted wave) transmitted to the downstream side R via the part of the back surface 8C and the bottom surface 9C when the float 3C turns and swings. This is because the part of the back surface 8C and the bottom surface 9C does hardly any work on water when the float 3C moves to turn.

Moreover, as in the case describe above, the float 3C is configured such that the volume of a portion on the downstream side R of a center line C of the column 2C is smaller than the volume of a portion on the upstream side F. Moreover, the wave power generation device 1C can employ any one of Control Formulae (19), (20), (24), and (25) described above for the control of the float 3C.

REFERENCE SIGNS LIST 1 wave power generation device
2 column
3 float
4 power generator, drive mechanism, motor
5 frame body
8 back surface
9 bottom surface
11 controller
13 position sensor
14 wave sensor
20 incident wave
21 reflection wave
22 transmitted wave
C center line
F upstream side
R downstream side
W wave

We claim:

1. A wave power generation device comprising:
a column;
a float configured to move relative to the column in response to a wave impacting the float,
a power generator configured to generate electric power through the movement of the float;
a wave sensor configured to measure a position $\eta_{x=0}$ of the wave one of relative to the mean water level WL in the vertical direction and relative to the column in the vertical direction;
a position sensor configured to measure a position z of the float one of relative to the mean water level WL in the vertical direction at a position (x=0) of the float and relative to the column in a vertical direction at a position (x=0) of the float;
a drive mechanism configured to apply an external force to the float; and
a controller configured to receive the height $\eta_{x=0}$ measured by the wave sensor and the position z of the float measured by the position sensor, and to control the drive mechanism, wherein
the controller is configured to calculate a speed z' at which the float is to be controlled to move, from the height $\eta_{x=0}$ measured by the wave sensor and the position z of the float measured by the position sensor, and to control the drive mechanism in such a way that the float moves at the calculated speed z',
in accordance with one of the formulas $$z'=K_A(\eta_{x=0}-K_C z) \qquad (19)$$

and $$z'=K_A(\eta_{x=0}-K_C z)/3 \qquad (24)$$

where $K_A$ is a constant equal to the frequency ω of the waveform divided by the wave formation efficiency $\overline{A}$, and $K_C$ is a constant $\overline{C}$, which is determined based on a boundary condition of the wave.

2. The wave power generation device according to claim 1, wherein the wave sensor is configured also to calculate a mean water level WL of a sea surface from measurements of the wave.

3. A method of controlling a wave power generation device including: a float configured to move relative to one of a column moored in the sea and a water level WL; a power generator configured to generate electric power through the movement of the float; a wave sensor configured to measure the height $\eta_{x=0}$ of a waveform; a position sensor configured to measure a position of the float relative to the column or the mean water level WL in the vertical direction at a position (x=0) of the float; a drive mechanism configured to apply an external force to the float; and a controller configured to receive the height $\eta_{x=0}$ measured by the wave sensor and the position z of the float measured by the position sensor, and to control the drive mechanism, the method comprising:
using the wave sensor to measure a position $\eta_{x=0}$ of the wave one of relative to the mean water level WL in the vertical direction and relative to the column in the vertical direction;
using the position sensor to measure a position z of the float one of relative to the mean water level WL in the vertical direction at a position (x=0) of the float and relative to the column in a vertical direction at a position (x=0) of the float;
using the controller to calculate a speed z' at which the float is to be controlled to move from the measured position z of the float and the measured position $\eta_{x=0}$ of the wave, in accordance with one of the formulas $$z'=K_A(\eta_{x=0}-K_C z) \qquad (19)$$

and $$z'=K_A(\eta_{x=0}-K_C z)/3 \qquad (24)$$

where $K_A$ is a constant equal to a frequency ω of the waveform divided by the wave formation efficiency $\overline{A}$, $K_c$ is a constant $\overline{C}$, which is determined based on a boundary condition of the wave; and
applying an external force to the float with the drive mechanism in such a way that the float moves at the speed z'.

4. The method according to claim 3, further comprising using the wave sensor to calculate a mean water level WL of a sea surface from measurements of the waveform, wherein the wave sensor is used to measure a position $\eta_{x=0}$ of the wave relative to the mean water level WL in the vertical direction and the position sensor is used to measure a position z of the float relative to the mean water level WL in the vertical direction at a position (x=0) of the float.

5. The wave power generation device according to claim 3, wherein the float has a front side from which the wave comes, a back surface on the downstream side of the wave opposite to the front side, and a bottom surface, and wherein an angle formed between the bottom surface and the back surface is smaller than 90°.

\* \* \* \* \*